(No Model.)

F. E. HALL.
ELASTIC TIRE.

No. 604,042.  Patented May 17, 1898.

WITNESSES
Drury W. Cooper
Edwin B. Hopkinson.

INVENTOR
Frank E. Hall
By Kew. Curtis & Page
attys.

UNITED STATES PATENT OFFICE.

FRANK E. HALL, OF QUINCY, MASSACHUSETTS.

ELASTIC TIRE.

SPECIFICATION forming part of Letters Patent No. 604,042, dated May 17, 1898.

Application filed December 1, 1897. Serial No. 660,386. (No model.)

*To all whom it may concern:*

Be it known that I, FRANK E. HALL, a citizen of the United States, residing at Quincy, in the county of Norfolk and State of Massachusetts, have invented certain new and useful Improvements in Elastic Tires for Vehicles, of which the following is a specification, reference being had to the drawings accompanying and forming a part of the same.

The invention, subject of my present application, is an improvement in elastic tires, more especially adapted for use with or application to the wheels of carriages and similar vehicles, but applicable to the wheels of vehicles generally.

The invention has for its object the production of a better and more practicable form of tire for such purposes and to avoid in the construction of the same certain defects and objectionable features which are met with in tires of this class as heretofore made.

The device embodying my invention belongs to that special class of elastic vehicle-tires comprising a metallic rim or holder that encircles the felly of the wheel and a tire proper or bearing-surface for the wheel composed of india-rubber or similar elastic or cushioning material, and it is further distinguished by the division of the said tire proper into a number of independent sections or blocks separated, at least along the bearing or peripheral portions, by short spaces.

The improvement resides in the construction of the device as a whole and will be described by reference to the accompanying drawings.

Figure 1:
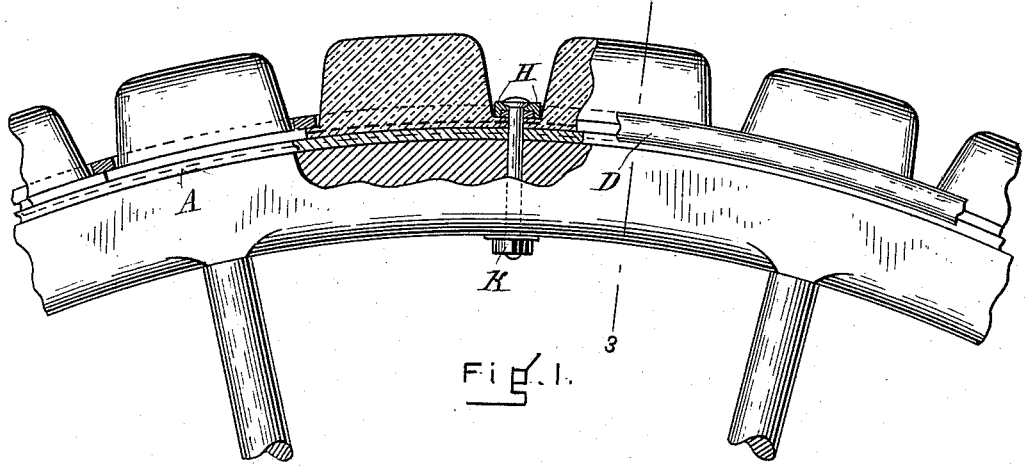
Figure 2:
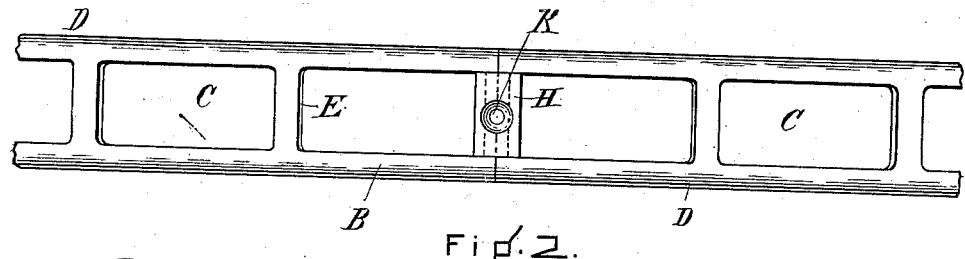
Figure 3:
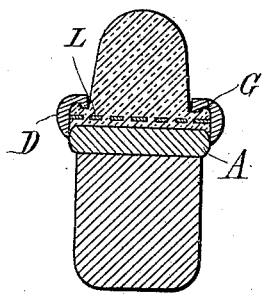
Figure 4:
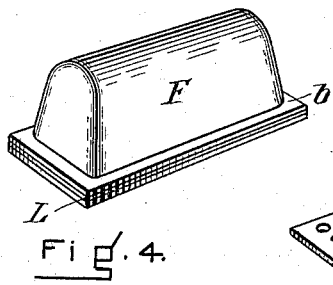
Figure 7:
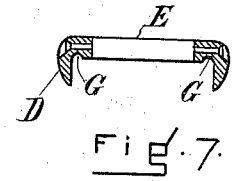
Figure 5:
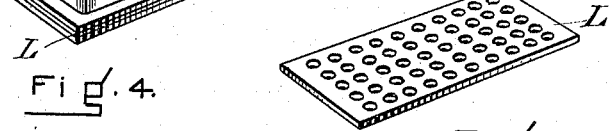
Figure 6:
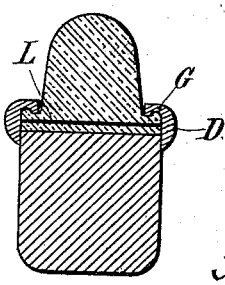

Figure 1 is a side view and part section of a portion of a wheel-rim with tire thereon. Fig. 2 is a plan view of a portion of the tire-holder. Fig. 3 is a section of the rim and tire, taken on the line 3 3 of Fig. 1. Fig. 4 is a perspective view of one of the blocks or sections. Fig. 5 is a view in perspective of a reinforcing-plate to be used in the tire. Fig. 6 is a sectional view of a modified form of the invention. Fig. 7 is a sectional view of a modified form of tire-holder.

The parts which in the preferred form of the invention constitute what I have termed the "rim" or "holder" for the tire are a flat band of steel or iron A and a perforated band of like material B. The former may be and in practice generally is the ordinary metal tire of the wheel shrunk onto the wooden felly and secured thereto in any proper and usual manner. The latter is a band with perforations or openings C C and downwardly-extending flanges D D, which normally, when the parts are in place, closely embrace and approximately cover the sides or edges of the band A.

The two flanges or edges of the band B may be in one piece with the cross-pieces E, or the latter, as shown in Fig. 7, may be independent and riveted to the sides. In either construction the openings in the band are for the reception of rubber blocks or projections from a rubber band, which constitute the tire proper.

I prefer to employ blocks or independent sections of hardened rubber F, molded in substantially the form shown, with a body of the cross-section of an ordinary rubber carriage-tire and a widened or flanged flat base $b$. The latter is of such dimensions as to fit in the recess or space under the band B, while the body just fits the rectangular openings in said band.

On each side of the line of openings in the band B and in the inner or under surface of the same runs a channel or groove G, into which the flanges $b$ are forced when the band is drawn tightly over the wheel, and this serves to secure more fixedly the sections in place.

Any convenient means may be used for uniting the ends of the band B or securing it to the wheel; but I prefer to use a plate H with downturned ends which engage with the cross-pieces at the ends of the band. The plate H is secured to the wheel-rim by a bolt or screw K.

In order to more effectually retain the elastic sections in place and prevent them from being pulled out through the openings in the band B, as by sudden side strains, I sometimes employ reinforcing-plates L, of metal or other suitable material, secured to or incorporated with the base and flanges of each section. These reinforcing-plates may be united to the material of the sections or blocks of india-rubber in the process of vulcanization or otherwise incorporated therewith. The plates may be of metal or other suitable material and when incorporated with the sections should be perforated, as shown.

The principle of the construction of my improved tire makes it possible to apply it directly to vehicle-wheels whether provided with ordinary metal tires or not without any change in the latter. To apply it, the sections of rubber are inserted in the openings in the band B, and the latter is placed around the wheel-rim, its ends drawn up until the flanges come down over the edges of the metal band or tire A or of the wooden felly, if the band A be absent, and firmly clamp the sections F, and it is then secured in position.

The band B serves merely as a retaining-band to hold the tire-sections in position, and as the flat bases of the latter rest upon the flat periphery of the band A the greatest resiliency and life are secured.

I am aware that wheels have heretofore been provided with elastic tires composed of sections or blocks of india-rubber secured in or between two metal bands, one of which in some cases has constituted the wheel-rim proper and in others has been shrunk upon the wooden or other felly; but my invention resides in the improved form or construction which I have devised for this purpose and which is characterized by the combination of the flanged and perforated band B and the rubber blocks or sections constructed and arranged as set forth.

What I claim is—

1. In a tire for vehicle-wheels, the combination with blocks or sections of india-rubber having flat bases with flanges at the sides and ends and adapted to rest upon the periphery of a wheel, of a band B, composed of side bars with flanges that embrace the side edges of the wheel, and cross-bars E, the said band being applied over the said rubber blocks with the side bars bearing on the flanges at the sides and the cross-bars over the flanges at the ends of said blocks, and means for drawing together the ends of the band and holding it to the wheel, as set forth.

2. In a tire for vehicle-wheels, the combination with blocks or sections of india-rubber having flat bases with flanges at the sides and ends and adapted to rest upon the periphery of a wheel, of a band B composed of side bars with flanges that embrace the side edges of the wheel and having channels or grooves G in their under surfaces, and cross-bars E, the said band being applied over the said rubber blocks with the side bars bearing on the flanges at the sides and the cross-bars over the flanges at the ends of said blocks and means for binding the said band firmly to the wheel whereby the flanges of the blocks will be forced up into the channels or grooves G, as set forth.

3. The combination in a wheel-tire with blocks or sections of india-rubber having flat bases with flanges at the sides and ends and adapted to rest upon the periphery of a wheel, and reinforcing plates or strips L secured to the said bases, of a band B composed of side bars with flanges that embrace the side edges of the wheel, and cross-bars E, the said band being applied over the rubber blocks with the side bars bearing on the flanges at the sides and the cross-bars over the flanges at the ends of said blocks, and means for drawing the band tightly about the wheel and thereby clamping the rubber blocks in position, as set forth.

In testimony whereof I have hereunto set my hand this 23d day of November, 1897.

FRANK E. HALL.

Witnesses:
  DRURY W. COOPER,
  EDWIN B. HOPKINSON.